Figure 10:
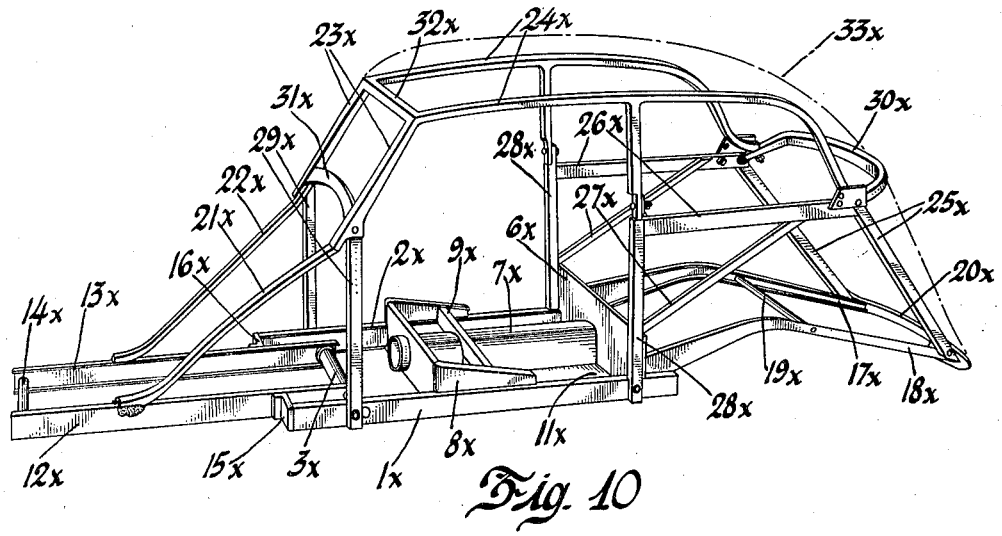

Feb. 15, 1938.　　K. STIEF ET AL　　2,108,215
AUTOMOBILE BODY
Filed Aug. 30, 1935　　4 Sheets-Sheet 1
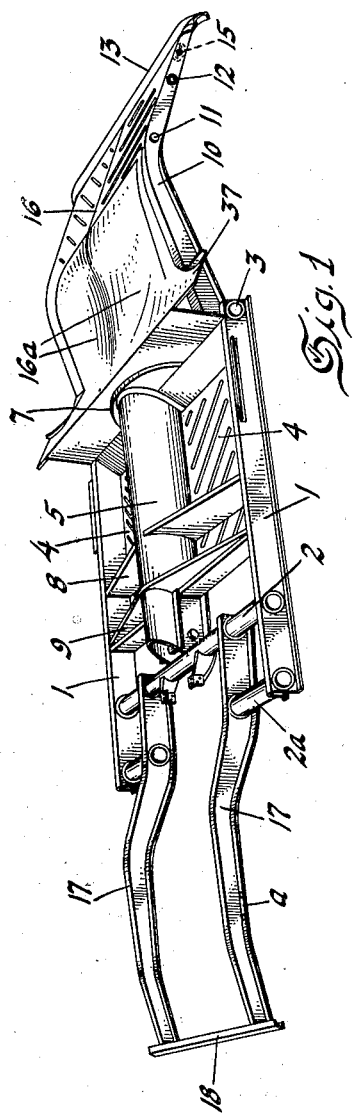
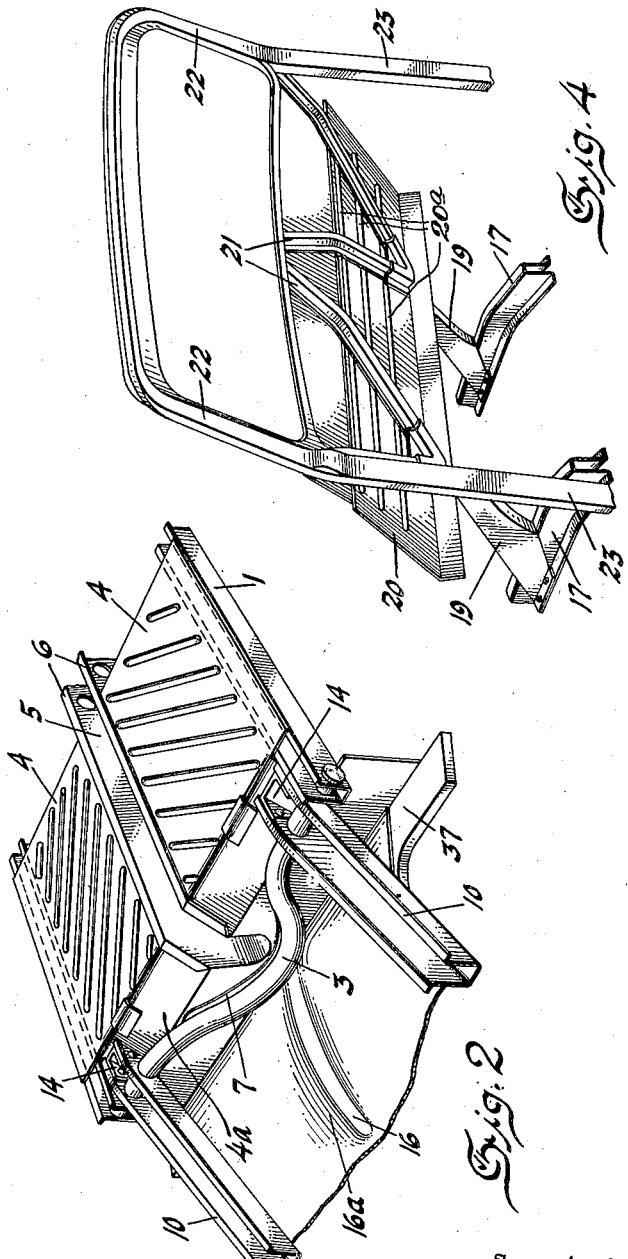
Inventors
Karl Stief &
Ronald K. Evans
By Blackmore, Spencer & Flint
Attorneys Feb. 15, 1938.  K. STIEF ET AL  2,108,215
AUTOMOBILE BODY
Filed Aug. 30, 1935  4 Sheets-Sheet 2
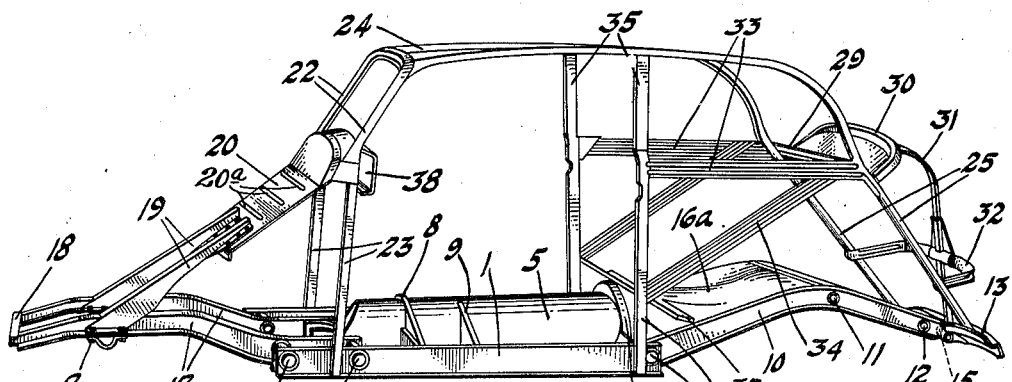
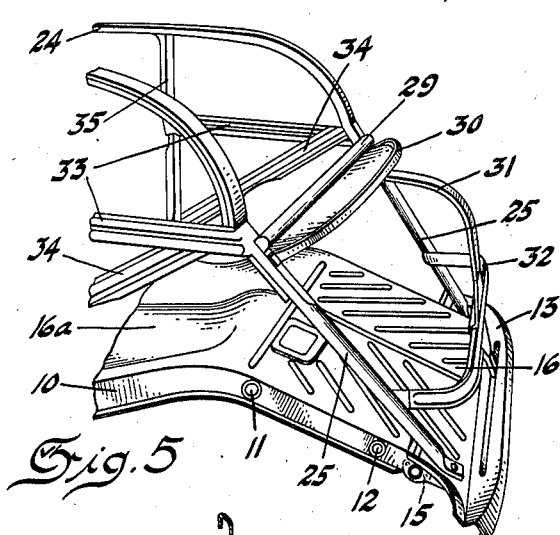
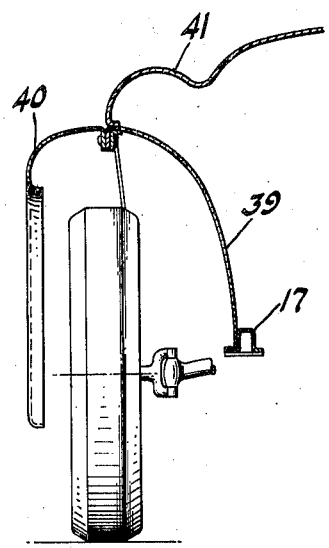
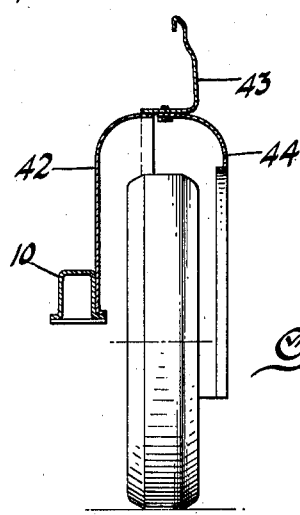
Inventors
Karl Stief &
Ronald K. Evans

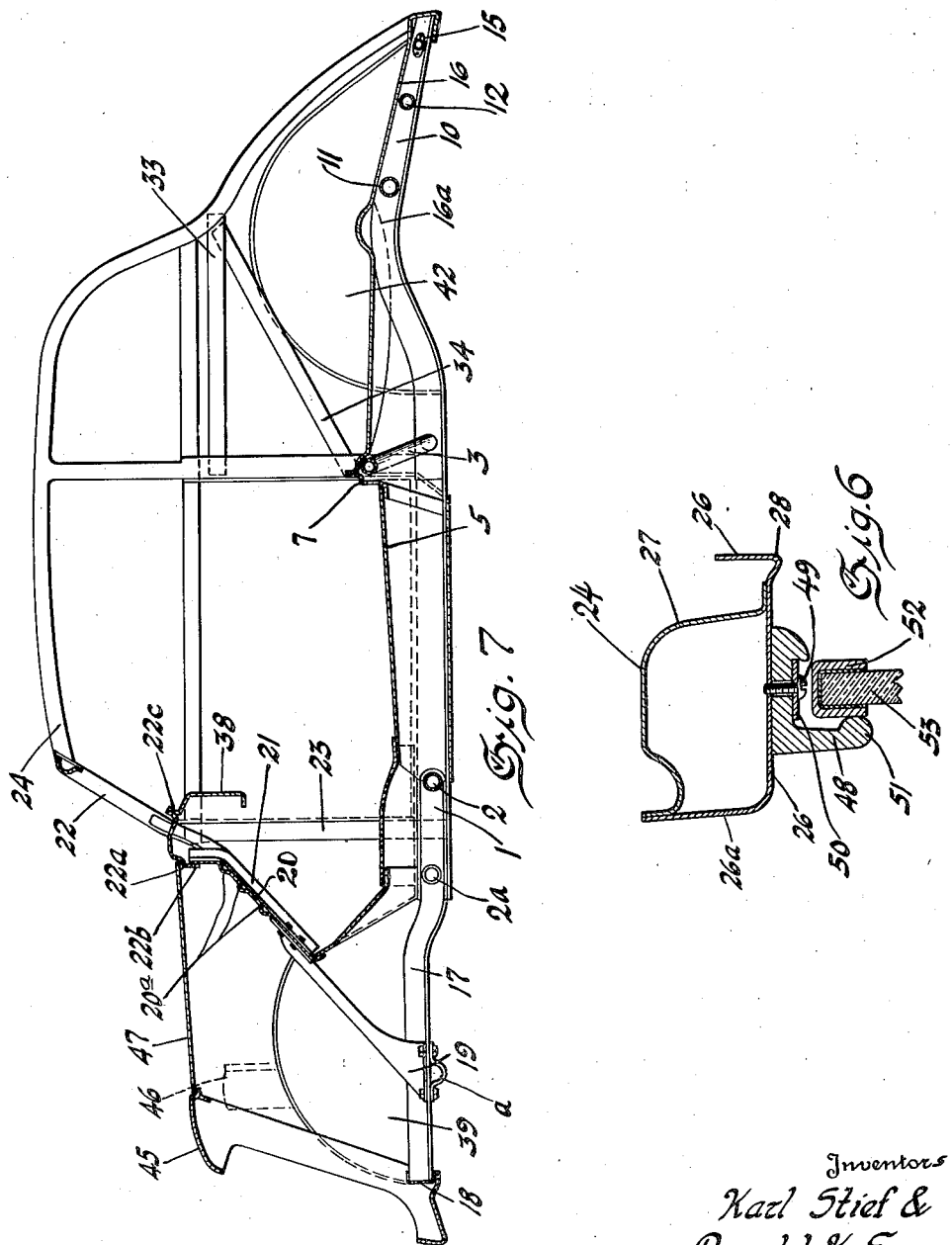

Patented Feb. 15, 1938

2,108,215

UNITED STATES PATENT OFFICE 2,108,215

AUTOMOBILE BODY

Karl Stief and Ronald K. Evans, Russelsheim-on-the-Main, Germany, assignors to General Motors Corporation, Detroit, Mich., a corporation of Delaware Application August 30, 1935, Serial No. 38,530
In Germany September 28, 1934

19 Claims.  (Cl. 296—28)

The invention relates to the design of chassis frames and of bodies, especially self-supporting bodies, that is, those in which the chassis frame forms at the same time the sub-frame of the body.

It is known in motor vehicles to make the chassis as a part of the underframe for the vehicle body and to secure the vertical posts of the vehicle body frame, the flooring, etc., directly to the longitudinal side beams of the chassis. In this way there is obtained a self-sustaining vehicle body, the backbone of which forms the so-called side bars. The combining of the chassis and the body frame has, besides preferable economic advantages, the advantages of improving the riding qualities because the center of gravity may be put lower down. This presumes, however, that the distance between the side members, calculated for the mounting of the engine, must be brought approximately to the full width of the car for the length of the body itself, because otherwise the floor of the body cannot be placed low enough. On account of the additional requirements of this varying intermediate distance, extremely difficult forms are produced, which are very expensive to manufacture, so that the economic advantages obtained by the combination are largely wasted.

The present invention has for its object the combining of the chassis and body frame in such a way that for the construction of the self-sustaining vehicle body only the usual commercial shaped iron in its ordinary form is necessary. The accompanying descriptions of two species rest essentially on the fact that, in contradistinction to former known existing constructions, the side bars no longer form the backbone of the vehicle body, but form the underframe of the vehicle body. To this frame there are secured in the longitudinal direction at the front and rear additional frames for the mounting of the motor and the attaching of the vehicle springs, these frames being reinforced by a specially formed edge strip of the vehicle body frame, i. e. the supporter for the body shell, so that they may be made of pieces with a small cross section. An appreciable decrease in weight is also obtained in that the flooring and other covering parts for the vehicle body frame are of sheet metal which also is made use of in stiffening the vehicle body.

It has already been proposed to make composite chassis frames of three separate frames, which consist of short pieces of iron shapes. Such composite chassis frames have the advantage, that they can be produced without extensive tooling, such as dies and the like. The invention starts out with the same construction of the chassis frame; aside from the forms of the individual parts used, what is new is the connection of the parts together and to the sheet metal of the floor and the tunnel for the propeller shaft in such a way that a frame is produced which is proof against bending, shifting and torsion, with the use of the least possible weight.

On the drawings are shown

Figure 11:
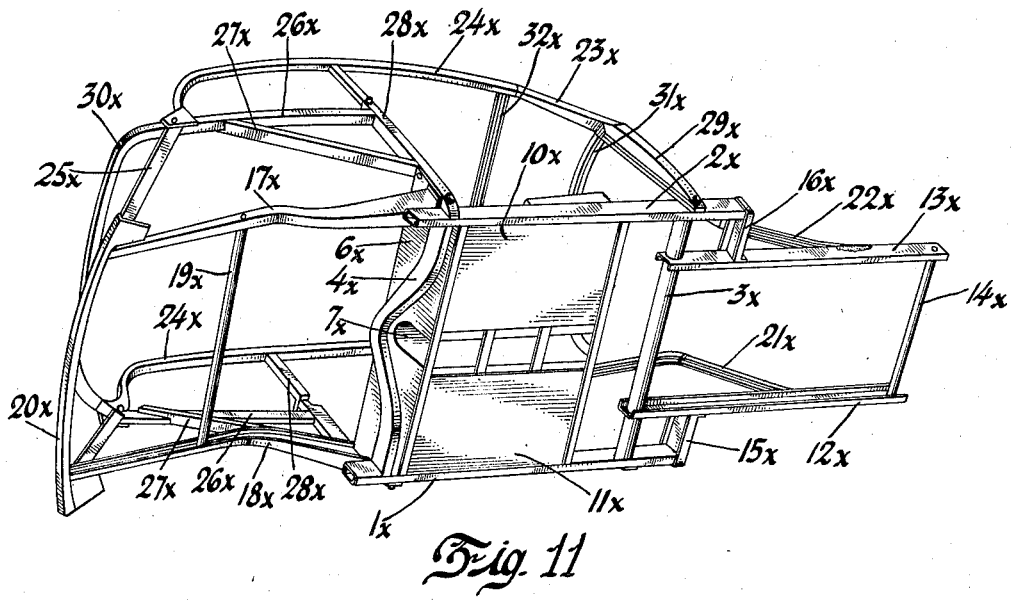

In Figure 1, the chassis frame in perspective view,

Figure 2 a part of the frame, seen from below,

Figure 3 the chassis frame with the body built on it,

Figure 4 the stiffening of the windshield plate and the windshield frame,

Figure 5 the bracing of the longitudinal arch,

Figure 6 a section through the longitudinal arch,

Figure 7 a section through the covered body,

Figures 8 and 9 the connection of the wheel coverings or fenders,

Figure 10 a perspective side view of the self-sustaining vehicle,

Figure 11 a view from beneath the body.

In Figure 1 the two side members of the main frame are designated by 1, the tubular cross members by 2 and 3. The main frame in its width corresponds to that of the body. The cross members 2 and 3 pass through holes in the webs of the side members 1 and 2 and are welded thereto.

As will be described later, the side members of the auxiliary frames which extend to the front and the rear are fastened to the cross members 2 and 3 of the main frame. The frames are composed of short sheet metal shapes or tubes; all the individual parts can be produced without large dies. The individual parts are connected together by arc or resistance welding.

If it is necessary to keep down the dimensions and therefore the weight, a main frame consisting only of the side members 1 and the cross members 2 and 3 is obviously not sufficiently proof against bending, torsion and shifting in order to be equal to the stresses which occur. The problem thus arises of stiffening the frame in such a way, while holding the weight down, that the side members 1 cannot shift or rotate with relation to each other when, for example, forces are applied at the opposite corners of the frame.

According to the invention, a frame that is proof against shifting and bending is obtained by the use of the sheet metal floor plates 4 and the arched tunnel 5 made of sheet iron, the frame, by the use of sheets with the edges turned up or by bending the floor sheets 4 upward, is at the same time made stiff enough to resist torsion. The construction is shown in detail in Figures 1 and 2.

The side members 1 of the main frame have a box-shaped cross section, which is formed by welding onto the open side of a channel section the longitudinal edges of the corrugated sheet 4, so that the side members are given a closed section with a high moment of resistance. The floor sheets 4 are at the same time connected with the longitudinal sides of the tunnel 5. The tunnel 5 has at its longitudinal sides the right angularly bent flanges 6 and to which the edges of the floor plate 4 are welded. At the same time a dust-tight closing of the inside of the car is obtained if the flanges 6 are welded from below against the sheet 4.

In order to make the frame proof against shifting and bending, the ends of the tunnel are welded to the cross members 2 and 3. Then a shifting of the side members with relation to each other is no longer possible. At the same time the high moment of resistance of the tunnel is utilized to add to the bending resistance of the frame.

In order to make the frame resistant to torsion, the corrugated floor plates 4 are bent up at the rear end as shown at 4a and welded to the rear cross member 3. The rear cross member 3 is bent up over the tunnel in order to permit free passage to the propeller shaft. The sheets 4 are welded to the tube 3 along the arch; they have a groove 7 running parallel with the arch, which increases the resistance of the sheets against forces parallel with the longitudinal axis of the frame and gives the necessary contact for the welding with the cross member 3. To the bent-up floor sheet are welded the rear end of the tunnel and the inner side walls of the side members 1. The fracture of the side walls of the tunnel and of the sheet metal side members 1 is thus avoided when bending stresses occur.

By the connection of the bent-up sheet metal flanges with the cross member 3 the frame is given a great resistance to torsion. This is further guaranteed by the sheets 8 and 9, mounted edgewise, at or near the front end of the floor sheets 4, and which are welded to the side members, the floor sheets and the tunnel. The sheets 8 and 9, which are designated as heel sheets, form at the same time two boxes which are proof against dust and stones, one of which can advantageously be used for the mounting of the battery and the other for a tool box.

The side members 10 of the rear frame are welded to the rear cross member 3 (Figure 2). The side members have about the same form as those of the main frame; only they have a cross section which decreases in height and width toward the end. For the fastening to the cross member 3 holes are provided in the side walls of the side members 10 and 1, through which the cross member 3 passes, as shown in Figure 2. It is welded to the side members at these points, the end surfaces of the side members are also welded to the edge of the bent-up floor sheet 4.

The side members 10 are arched upward in the usual manner to make room for the rear axle. The transverse connectors between the side members 10 are indicated by 11, 12 and 13; 11 and 12 are tubes, while 13 consists of an angle iron at the end of the side members.

On the side members 10, at the point where they are welded to the floor sheet 4, cover plates 14 are welded in, and these plates are provided with flanges bent at right angles and which rest against the inner sides of the side members 10. Holes are drilled entirely through the flanges and side members, through which are later placed the bolts for the fastening of the spring eyes. Similar plates are provided at 15 for the fastening of the springs.

For the stiffening of the rear frame there is used a large sheet metal plate 16 which is welded to the two side members 10 and the cross members 11, 12, and 13. It is welded at its outermost edge to the cross member 13 and the part which slants downward at the rear forms the bottom of the baggage compartment. It has in this part oblique grooves which prevent the bending of the plate. The front part of the plate has recesses, i. e. cavities 16a, which are arranged on both sides of the middle. At the front end the sheet 16 does not follow the form of the side members 10, but is bent upward and welded to the bent-up ends 4a of the floor sheets 4.

The cavities are of such a form that their deepest place is at the point where the greatest sagging of the upholstering requires it, they therefore permit a seat construction which saves space, which makes possible a lower body construction; they however at the same time increase the stiffness of the plate 16 and thereby increase the resistance of the rear frame against bending and torsion. Thus, by the form selected for the sheet 16, the frame is made resistant to bending and torsion.

The side members 17 of the front frame are welded to the cross member 2 of the main frame. The side members have the same form as the side members 1, except that, like side members 10, they decrease in size toward the front end. They are welded together at the front end by the use of a piece of channel section iron 18. In order to relieve the welding connection between the side members and the cross member 2 of torsional stresses, they are connected by means of additional short pieces of tubes 2a with the side members 1. This connection is also effected by welding.

At the point a in Figure 1, holes are provided in the side members 17 for the connection of the fastening plates of the front axle.

The frame illustrated in Figure 1 is entirely adequate to be used independently as a chassis frame. In the sample form of construction, however, a chassis frame is shown such as that in Figure 3, made in such a way as to serve at the same time as the sub-frame for the body. Thus the combination of the body and the sub-frame will be effected in such a way that the resistance to bending of the sub-frame, especially of the front frame, will be obtained at the same time.

As shown in Figures 3 and 4, two box-shaped braces 19, also formed of sheet iron, are welded to the side members 17 at a and at their upper ends are welded to the oblique upper windshield plate 20. The windshield plate is stiffened on the one hand by transverse grooves 20a and on the other hand by iron shapes 21 of box section and V form, the open sides of which are welded to the windshield plate, and running at an acute angle to the welding points of the braces 19, they make the plate very stiff. At the upper end the plate 20 and the sections 21 are bent at an obtuse angle and welded to the frame 22 of the windshield. The outside arm of the brace 21 is not welded to the lower bar of the frame 22 but is introduced into the channel section of the side part of the window frame 22 and there welded fast to the frame 22.

The frame 22 is formed out of a single piece and is very strong. It has a channel section on three sides and on the lower side (Figure 7) it is welded to the plate 20. The lower, longitudinal side 22a of the section is bent outward and provided with a flange 22b. The open sides of the frame 22 are welded to the extended webs of the front pillars 23, which are welded to the side members 1, as shown in Figure 3. In order to strengthen the lower side of the front frame, the upper edge of the instrument board is welded to the flange 22c, bent up on the inner side, and to the two front pillars 23. Thus, together with the lower side of the front frame and the upper part of the windshield plate the instrument board forms an open U-shaped box with a high moment of resistance, which stiffens the frame 22 against lateral shifting.

The fastening points of the braces 19 on the side members 17 lie about at the height of the connecting points of the front axles, designated by a. The forces exercised by these braces on the side member 17 are thus transmitted largely by the braces 19 and also by the plate 20 and the braces 21 to the frame 22 and the pillars 23. The pillars 23 are located with their channel section arranged in such a way that they easily can take these forces. Practically, the side members 17 are to be considered as beams loaded at a. Also excessive stresses in case of collisions will not produce fractures in the braces 19. The braces 19 can also be used with advantage for the mounting of the steering column, provision being made on one of the braces 19 for the fastening of the steering column. By mounting the column in this way, it cannot be driven against the driver in the case of a collision.

The frame 22 is welded to the longitudinal body arches 24 which are also made of sheet metal formed into a box shape. As shown in Figure 6, the longitudinal arches 24 consist of channel section lower beams 26 and of an upper sheet 27 bent into a right angle. This sheet 27 is welded to the bent-up edge 26a and to the web of the channel 26 in such a way that a channel is formed between the sheet 27 and the bent-up edge of the beams 26. This channel has a bead 28 which acts as a rain strip.

In the downward-bent ends of the longitudinal arches 24 are welded the obliquely mounted tubular braces 25, which are welded or riveted to the rear cross member 13 at the place on the rear side members 10 where the usual leaf springs are attached, so that here also the path of the forces passes directly from the axle into the supporting structure.

A suitable cross member 29, having the shape as shown in the drawings, connects the tubes 25 together. Parallel with the cross piece 29 runs the top support 30, to which also is fastened one beam of the cross-shaped frame 31, 32, which carries a screw bolt with a suitable wing nut for fastening the spare wheel.

The longitudinal arches 24 are further stiffened by the braces 33, 34. The braces 33, made of shaped sheet metal, are welded to the arches and to the door pillars 35. The braces 34 are welded to the braces 33 and to angle irons 36 which are welded to the side members 1 and to the extensions 37 of the sheets 16. These angles serve at the same time for the mounting of the pillars 35. The instrument board is indicated at 38.

Portions of the metal covering or sheeting are also required to aid in stiffening the body, particularly the cover plates or mud guards of the front and rear wheels. As shown in Figures 7, 8 and 9, the inner cover plate 39 of the front wheels is welded at its lower edge to the side members 17 near its rear to the braces 19, and at its front to the radiator hood 45, which in turn is welded to the channel iron 18. The two cover plates 39, by their fastening to the braces 19, form an additional stiffening of the front side members 17.

The cover plates 39 act at the same time as a connection for the fenders 40 and the hood 41 (Figure 8).

The inner cover plates 42 of the rear wheels are likewise welded at their lower edge to the side members 10 of the rear frame and also to the body covering sheet 43, so that by means of the fastening of the covering sheets as described, a notable stiffening of the rear frame is obtained. The rear wheel fenders 44 are then secured to the cover plates 43.

The headlight housings 46 are welded to the front cover plates 39. Also an additional stiffening of the radiator hood 45 is provided by the sheet 47, which is welded to the lower edge of the window frame and serves for the hinging of the sides of the engine hood.

On the underside of the arch 26 at the door openings there is secured the L-shaped strip 48. The strip 48 is secured by the screws 49 and washers 50 and has a rounded bead 51 against which there is adapted to strike the frame 52 of the door window 53. The door is of the shorter form having no frame portion above the belt line of the vehicle. Where a full sized door is used the strip 48 is either not used at all or has a different shape.

In the second species of the invention as shown in Figure 10, the underframe of the vehicle is composed of two side rails $1x$ and $2x$, and united to each other by a tube $3x$ and a transverse support $4x$ and each comprising two rails U-shaped in cross section. The support $4x$ has also a U-shaped profile. It is reinforced by means of a vertically positioned steel plate $6x$ which determines the inside of the vehicle body at its position. The support $4x$ is upwardly arched to accommodate the proportionally high positioned Cardan shaft. The Cardan shaft passes through a sheet metal tunnel $7x$ which is positioned between the sheet $6x$ and an auxiliary U-shaped member $8x$. The member $8x$ serves at the same time as a support upon which to build the front seat of the vehicle body. It is made of a sheet of metal with bent over edges. The sides of the auxiliary member are suitably stiffened by means of transverse stiffeners $9x$. For closing the bottom use is made of two sheet metal plates $10x$ and $11x$, these plates, as well as the rest of the parts, being rigidly connected to the longitudinal supports $1x$ and $2x$. The frame $1x$, $2x$, $3x$, and $4x$ has such an unusual rigidity that no especial use of material is necessary to increase it.

To the front of the underframe there is secured a frame composed of the shaped bars $12x$ and $13x$ and the tube $14x$, this frame being for the mounting of the engine and for the attachment of the spring suspension. The longitudinal supports $12x$ and $13x$ are provided with openings through which the tube $3x$ passes. They are further united with the underframe by welding in place the shaped members $15x$ and $16x$ so that there is a completely rigid connection between the two frames.

At the rear of the underframe there is secured a second frame comprised of longitudinal supports 17x and 18x and the transverse supports 19x and 20x, this frame likewise being formed of sheet metal of ordinary shapes and having turned-over edges. The longitudinal supports 17x and 18x are united with the underframe 1x, 2x in any suitable way but preferably by welding. The rear spring suspension means is attached to the rear secondary frame.

The front door pillars are indicated at 29x, the lower windshield rail at 31x and the upper windshield rail at 32x. The upper ends of the door posts 29x are secured to the lower ends of the window rails 23 and to the lower rail 31x. If desired, the pillars 29x and rail 31x may be made of one piece.

To reinforce the longitudinal supports projecting forwardly and rearwardly from and attached to the underframe, use is made of the outside members of the vehicle body. These outside members consist of the obliquely and forwardly extending U-shaped rails 21x, 22x, of the window rails 23x, 23x, the roof rails 24x and the obliquely rearwardly extending rails 25x. An additional stiffening of the rear frame is formed by the rails 26x and 27x which are secured to the rear door pillars 28x of the vehicle body, and by the rail 30x secured at its ends at the junction of the rails 24x, 25x and 26x.

A remarkable stiffening of the front rails is accomplished by the outer metal sheathing 33x for covering the front of the vehicle body, this sheathing being likewise rigidly united with the front rails. In a vertical direction the front rails are supported by the door pillars 29x.

The various rails or beams used in the construction are preferably U-shaped in cross section. In some instances, such as the roof rails 24x, it has been impracticable to show the cross-sectional U-shape construction. The channel of the U of the roof rails 24x preferably faces upwardly.

We claim:

1. In a chassisless vehicle, a main center frame, front and rear secondary frames secured to said main frame, a supporting and reinforcing member extending substantially centrally of the main frame and secured to the sides thereof, a plate secured to the main frame, and a tunnel secured to said member and plate.

2. In a chassisless vehicle, a main center frame front and rear secondary frames secured to said main frame, a U-shaped supporting and reinforcing member free of the secondary frames and extending substantially centrally of the main frame, said member having the arms of the U secured to the sides of the frame.

3. In a chassisless vehicle body, a central main frame, front and rear secondary frames, transverse bars to secure the secondary frames to the main frame, transverse reinforcing members between the sides of the main frame, said members tapering from their ends to the middle and having their mid portions projecting above the level of the main frame, said members forming seat supports.

4. In a chassisless vehicle body, a central main frame, front and rear secondary frames secured to the main frame, a floor plate secured to the main frame and extending to the rear secondary frame, said plate being bent upwardly at an incline where the plate meets the rear frame and then bent upwardly perpendicular to the main frame, said bent up portions forming a heel board for the rear seat.

5. In a chassisless vehicle body, a central main frame having side members, front and rear secondary frames secured to the main frame, spaced transversely extending reinforcing members intermediate the sides of the main frame, means to secure the members in place, a floor plate secured to the bottom of the frame closing the bottom of the space between the reinforcing members, said members and plate forming a receptacle with the side members of the main frame.

6. In a chassisless vehicle body, a central main frame having side bars of channel cross section, said frame having a rear cross member arched to accommodate a propeller shaft, front and rear secondary frames secured to the main frame, a floor plate secured to the main frame and bent upwardly at its rear end, said upwardly bent portion being secured to the arched rear cross member.

7. In a vehicle body, a central main frame, front and rear secondary frames, top supporting arches extending from the front frame to the rear frame, said arches at their top being U-shaped in cross section, and a substantially right angularly shaped strengthening member welded in the U.

8. In a vehicle body, a central main frame, front and rear secondary frames, top supporting arches extending from the front frame to the rear frame, said arches at their top being U-shaped in cross section and having a substantially right angularly shaped member welded therein, and a rain strip or channel formed in the top portion of said arch.

9. In a chassisless vehicle, channel-shaped side sills, a tunnel between the sills to accommodate a drive shaft, floor plates connected to the tunnel and to the side sills and closing the space between the tunnel and the sills, said plates closing the open side of the channel-shaped side sills to form a box-sectioned construction, and transverse seat supports secured between the sills and the tunnel and over the plates.

10. In a chassisless vehicle, side sills, a plate at the rear of said sills and connected to both sills, said plate having a cut out portion, a tunnel parallel with the side sills and having one end secured to the plate at the cut out portion, and means to connect the front end of the tunnel to the side sills.

11. In a chassisless vehicle, central body sills, rear body sills placed closer together than the central body sills, said central and rear sills overlapping and having holes where they overlap, a bar passing through the holes to secure the sills together, a plate at the junction of the sills and extending between and being secured to the central sills, the rear body sills terminating at the plate, and means for securing the ends of the rear sills to the plate.

12. In a chassisless vehicle, central body sills, rear body sills placed closer together than the central body sills, said central and rear sills overlapping and having holes where they overlap, a bar passing through the holes to secure the sills together, said bar being arched to accommodate a propeller shaft, a plate at the junction of the sills and extending between and being secured to the central sills, said bar secured to said plate, the rear body sills terminating at the plate, and means for securing the ends of the rear sills to the plate.

13. In a chassisless vehicle, central body sills, rear body sills placed closer together than the central body sills, said central and rear sills overlapping and having holes where they overlap, a bar passing through the holes to secure the sills together, a plate at the junction of the sills and extending between and being secured to the central sills, the rear body sills terminating at the plate, means for securing the ends of the rear sills to the plate, and a reinforcing plate secured over the rear sills and having its front end secured to the first-named plate.

14. In a chassisless vehicle, central body sills, rear body sills placed closer together than the central body sills, said central and rear sills overlapping and having holes where they overlap, a bar passing through the holes to secure the sills together, a plate at the junction of the sills and being secured to the central sills, means for securing the ends of the rear sills to the plate, and a reinforcing plate secured over the rear sills and having its front end secured to the first-named plate, said reinforcing plate forming a seat bottom and having depressions to enable the seat to be given a lower position.

15. In a chassisless vehicle body, main sills, secondary rear sills having their ends overlapping the main sills, said main sills being channel shaped, means secured to both sills where they overlap to secure them together, a plate extending between the main sills and secured thereto, means to secure the rear sills to the plate, a tunnel extending longitudinally of the main frame, floor plates secured to the tunnel and to the side sills of the main frame and forming with said sills a box-sectioned construction, and means to secure the tunnel and the floor plates to the first mentioned plate.

16. In a chassisless vehicle body, main body sills, front and rear sills spaced closer together than the main sills and having their ends overlapping with the main sills, means at the overlapping portions at the front sills to secure the sills together, a tunnel between the main body sills, said tunnel having one end secured to the said means, means at the overlapping portions at the rear sills to secure the rear and main sills together, and connecting means secured to the other end of the tunnel and extending between the sills and secured thereto.

17. In a chassisless vehicle, a main central frame, front and rear secondary frames rigidly secured to said main frame, a vertically positioned strengthening plate at the place of junction of the main frame to the rear secondary frame, said plate extending down into the main frame and above both frames and secured to the main frame to form a seat support, and means to secure the ends of the rear secondary frame to the plate.

18. In a chassisless vehicle body, a main frame, a narrower front secondary frame secured to said main frame, a windshield frame, door pillars supporting said windshield frame from the main frame, inclined braces secured at their lower ends to the front frame and extending rearwardly and terminating short of the windshield frame, an inclined plate extending across the front of the vehicle and secured to the inclined braces and extending to and secured to the windshield frame, said plate connecting the braces to the windshield frame, and reinforcing members secured to the inclined plate and connected to the windshield frame.

19. In a chassisless vehicle body, a main frame, a narrower front secondary frame secured to said main frame, a windshield frame, door pillars supporting said windshield frame from the main frame, inclined braces secured at their lower ends to the front frame and extending rearwardly and terminating short of the windshield frame, and an inclined plate extending across the front of the vehicle and secured to the inclined braces and extending to and secured to the windshield frame, said plate connecting the braces to the windshield frame.

KARL STIEF.
RONALD K. EVANS.